United States Patent Office 3,428,180
Patented Feb. 18, 1969

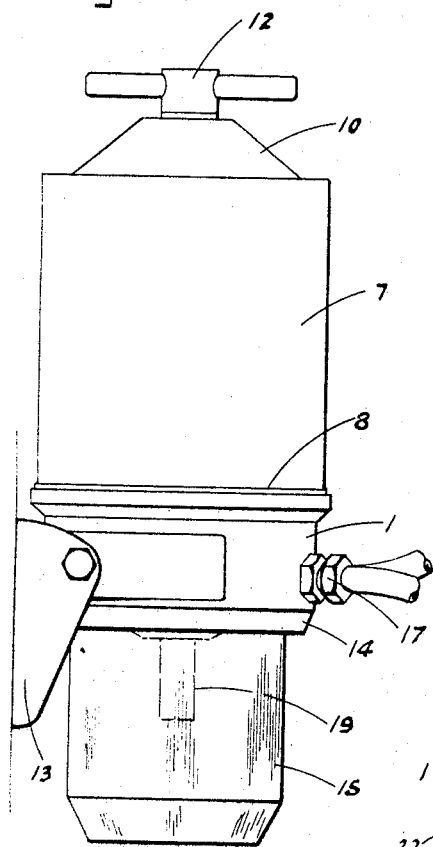
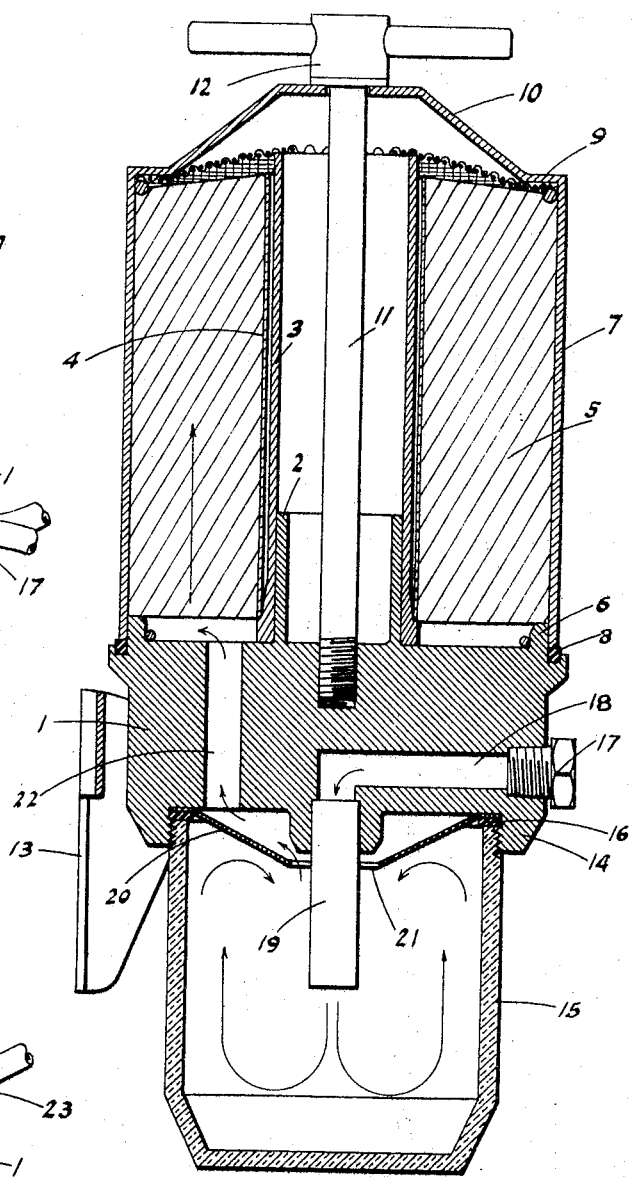
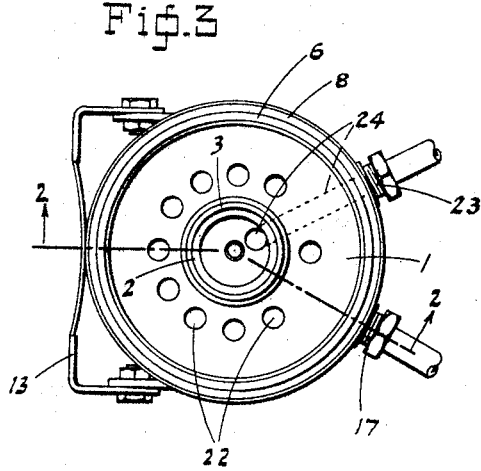

3,428,180
FILTER UNIT
Wendal A. Rogers, Stockton, Calif.
(304 Greenwich Lane, Modesto, Calif. 95350)
Filed Apr. 11, 1966, Ser. No. 541,606
U.S. Cl. 210—311    3 Claims
Int. Cl. B01d 21/00

ABSTRACT OF THE DISCLOSURE

A filter, for the liquid fuel of an internal combustion engine, adapted to be interposed in the fuel line and including a filter cartridge and a separate sediment-trapping bowl; either one being optionally removable without disturbing the other.

---

This invention relates in general to a filter unit used to filter liquid fuel, such as gasoline or diesel oil, being fed to an internal combustion engine.

Such a filter unit ordinarily includes a filter cartridge which tends to become prematurely clogged if the fuel carries an appreciable amount of heavy sediment. Under such circumstance, it has heretofore been necessary to replace the filter cartridge more frequently than normal in order to maintain an efficient filtering and fuel-flowing action.

It is, therefore, the major object of the present invention to provide an improved filter unit constructed and operative in a manner such that heavy sediment in the fuel is prevented from flowing to the filter cartridge whereby more frequent than normal replacement thereof is substantially eliminated.

Another important object of this invention is to provide a filter unit, as in the preceding paragraph, wherein the desired result is effected by a novel sediment-trapping bowl assembly interposed in the fuel flow line ahead of the filter cartridge; such bowl assembly being included in the filter unit as a component part thereof whereby no separate installation is required.

An additional important object of this invention is to provide the sediment-trapping bowl assembly which includes a bowl, a depending fuel flow or feed tube, and an inverted frusto-conical baffle plate in a novel and highly effective combination.

It is also an object of this invention to provide a sediment-trapping bowl assembly wherein the bowl is transparent, and adapted to be readily removed and replaced manually whereby—when the operator views an accumulation of sediment in the bowl—it can be promptly and easily removed, cleaned, and replaced. The operator is thus assured that the filter cartridge will not become sediment clogged and will continue to function satisfactorily without the necessity of replacement other than at normal frequency.

A further object of the invention is to provide a filter unit which is designed for ease and economy of manufacture, ready installation, and convenience of servicing.

A still further object of the invention is to provide a practical, reliable, and durable filter unit and one which is exceedingly effective for the purpose for which it is designed.

These objects are accomplished by means of such structure and relative arrangement of parts as will fully appear by a perusal of the following specification and claims.

In the drawings:
FIG. 1 is a side elevation of the improved filter unit.
FIG. 2 is an enlarged sectional elevation of the filter unit, taken substantially on line 2—2 of FIG. 3.

FIG. 3 is a top plan view of the filter unit with the filter cartridge and its housing removed.

Referring now more particularly to the drawings and to the characters of reference marked thereon, the filter unit comprises a relatively short cylindrical body 1 formed with a centrally disposed short upstanding tube 2 which provides a locating and supporting means for an elongated upstanding tube 3. The tube 3 is of a size and height to receive the central core 4 of a conventional filter cartridge 5. The diameter of such filter cartridge is substantially the same as that of the body 1, and at its lower end said filter cartridge is preferably supported by an upstanding peripheral flange 6 on the body 1.

The filter cartridge 5 is relatively tightly enclosed by a removable cylindrical housing 7, which closely fits about the cartridge 5, and at its lower end said housing rests on a seal 8 extending about and mounted on the body 1. At the top the filter cartridge 5 is engaged adjacent its periphery by an edge flange 9 forming a portion of the top 10 of said housing, and which top—as a whole—slopes upwardly from the flange 9 to leave a space in the housing clear of the cartridge. The housing 7 is removably held in position (and the filter cartridge 5 clamped against vertical displacement) by a screw rod 11 projecting downwardly through the top of the housing, through the tube 3 and threaded into the body 1. Above the housing 7, the rod 11 is provided with an enlarged head 12 having a sealing fit against the top of the housing and arranged to be manually rotated.

At the back, the housing is provided with a bracket 13 whereby the filter unit may be mounted on any suitable vertical wall and held in a rigid upright position without interfering with the ready removal and replacement of the filter cartridge when necessary.

At its lower end, the body 1 is formed with a short depending neck 14 into which the upper end of a sediment-trapping bowl 15 is removably screwed; the bowl being then engaged against an anti-leak gasket 16. The bowl 15 is made of glass or other transparent material resistant to gasoline or diesel fuel. The body 1—on the front thereof—is provided with a liquid fuel intake fitting 17 which communicates with a passage 18 in the body 1 leading to a fuel flow or feed tube 19 mounted in the body centrally thereof and depending into the bowl 15; said tube terminating well short of the bottom of the bowl.

An inverted frusto-conical baffle plate 20 is mounted in the bowl at the top thereof and in surrounding relation to the upper portion of the tube 19; said baffle plate being held in place by and between the gasket 16 and the bottom surface of the body 1. The central opening 21 in the baffle plate is of sufficiently greater diameter than the tube to leave a flow space therebetween.

The body 1—radially out from the central tube 2—is formed with a plurality of vertical flow passages 22 therethrough; such passages providing communication between the bowl 15 above the baffle plate 20 and the interior of the housing 7 below the filter cartridge 5.

A liquid fuel outlet fitting 23 is mounted on the body 1 in offset relation to the intake fitting 17, and a passage 24 extends radially in the body from said fitting 23 to a termination at the upper surface of the body within the tube 2.

In the operation of the described filter unit—with the same interposed in a fuel line so that the flow enters at the fitting 17 and discharges at the fitting 23—said filter unit functions as follows:

From the intake fitting 17, the fuel flows through passage 18, downwardly in the tube 19 and thence into the bowl 15. From the tube 19 the fuel is deflected by the bottom of bowl 15 with an outward curling action so that the fuel then flows upwardly adjacent the sidewall of the bowl. The upflowing fluid impinges on the underside of the baffle plate 20 which causes the fuel to travel or roll radially inward and to thence pass upwardly through the baffle plate opening 21, as indicated in FIG. 2.

In this manner, the described sediment-trapping bowl assembly (which may be termed a pre-filter) causes the initially relatively slow speed of flow of the fuel to be further reduced. As a result, substantially all of the heavier foreign matter that may be entrained in the fuel is precipitated into the bowl 15 and accumulates—as sediment—in the bottom thereof. As the bowl is transparent, the amount of any such accumulation may be seen at any time, and the bowl may be removed and cleaned whenever deemed necessary.

After the fuel passes through the bowl 15 as described, it is forced upwardly through the vertical flow passages 22 into the bottom of the housing 7, and then upwardly through the filter cartridge 5. The cleaned or filtered fuel emerges from the top of the cartridge, passes into the top of the tube 3 and thence flows downwardly therein, and finally discharges through the outlet passage 24.

By reason of the dual or successive filtering actions attained by the described filter unit, the heaviest particles of any foreign matter in the fuel are caught and trapped in the bowl, and only lighter foreign matter passes into and is removed by the filter cartridge 5. The filter cartridge may, therefore, be used and remain in the filter unit without replacement for a much longer time than would otherwise be the case. The expense of efficient filter maintenance is thus substantially reduced.

From the foregoing description, it will be readily seen that there has been produced such a filter unit as substantially fulfills the objects of the invention, as set forth herein.

While this specification sets forth in detail the present and preferred construction of the filter unit, still in practice such deviations from such detail may be resorted to as do not form a departure from the spirit of the invention, as defined by the appended claims.

Having thus described the invention, the following is claimed as new and useful and upon which Letters Patent is desired:

1. A filter unit comprising a body having intake and outlet passages for a liquid to be filtered, an enclosed filter cartridge supported on the body in communication with said passages for circulation of the liquid through said cartridge, and a sediment-trapping bowl mounted on the body and interposed in the intake passage ahead of the filter cartridge; the bowl being below the body and the cartridge upstanding from and above the body; the intake passage including a liquid feed tube depending into the bowl, and the body having another passage providing communication between the top of the bowl and the cartridge.

2. A filter unit, as in claim 1, with a baffle plate of inverted frusto-conical form mounted in connection with the body and interposed between the bottom surface of said body and the top of the bowl; the baffle plate surrounding the tube in clearance relation.

3. A filter unit comprising a body adapted to be mounted in a fixed position, an enclosed filter cartridge located and supported on top of and removably connected to the body, a sediment-trapping bowl removably supported by and depending from the body, liquid intake and outlet passages in the body, and means to feed liquid from the intake passage first into the bowl and then from the bowl to the lower end of the cartridge, and finally from the upper end of the cartridge to the outlet passage; including a first passage between the intake passage and the bowl, a second passage extending from the bowl to the top of the body and the bottom of the cartridge, and a third passage leading from the upper end of the cartridge to the outlet passage.

References Cited

UNITED STATES PATENTS 3,237,769   3/1966   Humbert _____ 210—299 X

FOREIGN PATENTS 667,018   7/1963   Canada.

REUBEN FRIEDMAN, *Primary Examiner.*

THEODORE GRANGER, *Assistant Examiner.*

U.S. Cl. X.R.

210—94, 439, 440